May 12, 1953  J. TADDONIO  2,637,923
DISPLAY APPARATUS
Filed Jan. 23, 1951  2 Sheets-Sheet 2
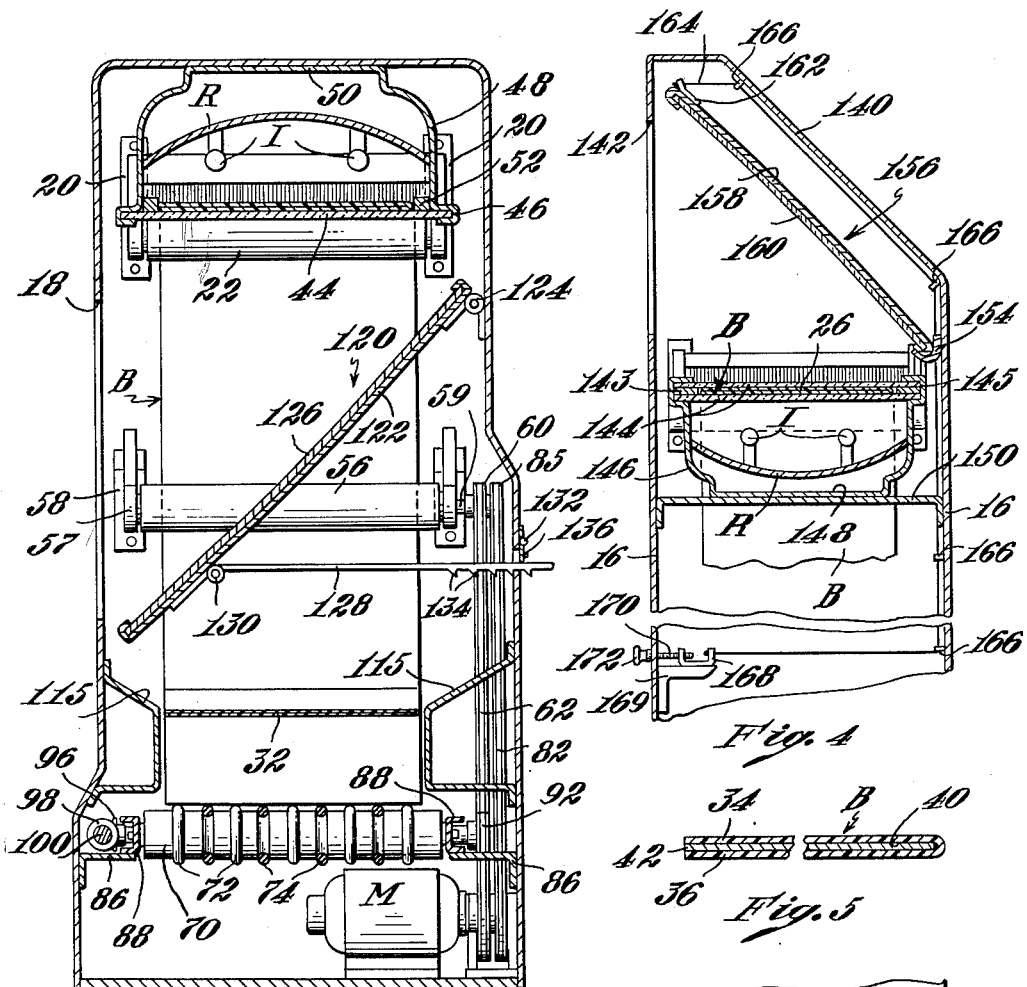
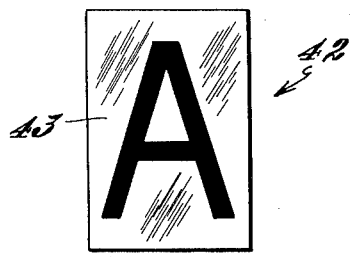
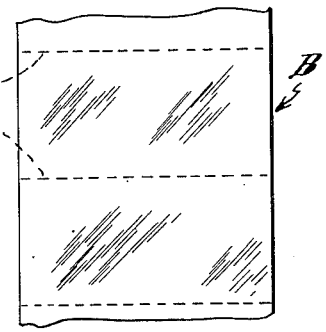
Inventor
Joseph Taddonio
by Roberts, Cushman & Groves
Attys Patented May 12, 1953

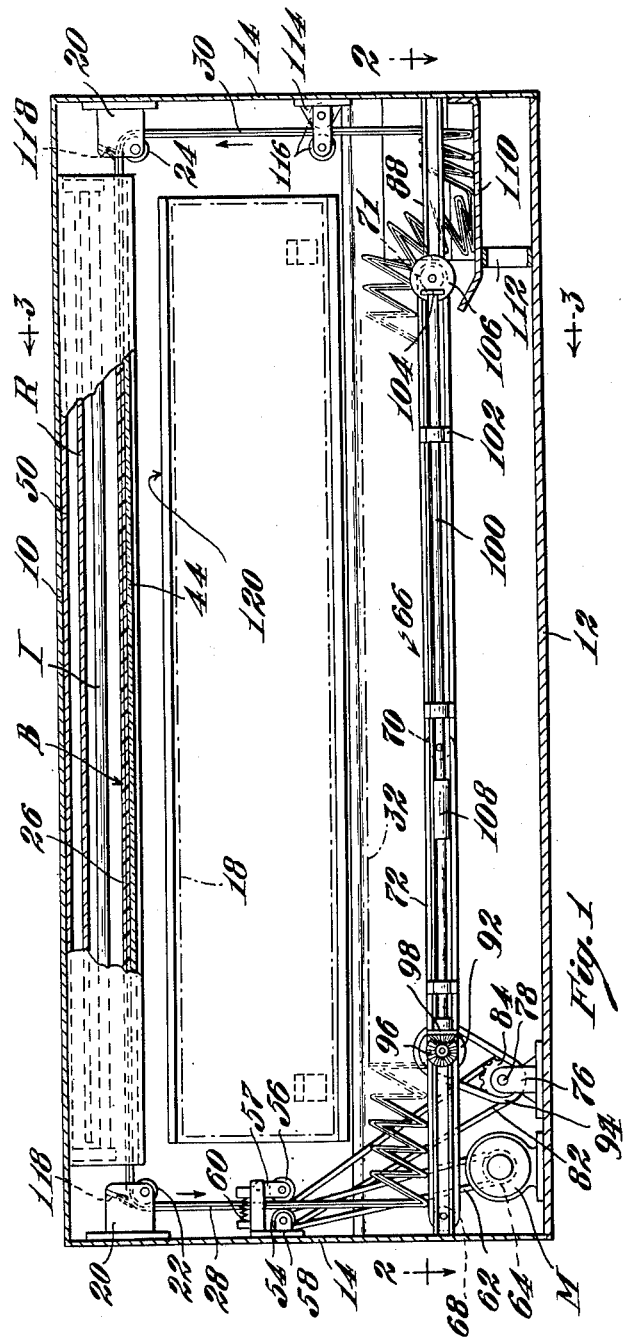

2,637,923

UNITED STATES PATENT OFFICE 2,637,923

DISPLAY APPARATUS

Joseph Taddonio, East Boston, Mass.

Application January 23, 1951, Serial No. 207,283

7 Claims. (Cl. 40—28)

1

This invention relates to display apparatus such as may be used for advertising and/or for dissemination of news, and more especially of a kind to present a running display repeating the same subject matter or continually changing the subject matter.

The principal objects of the invention are to provide a compact, illuminated display apparatus wherein there is a sight opening through which may be seen the subject matter to be displayed, but which is so constructed that the display matter is substantially concealed from exposure to the elements, thereby to prolong its natural life, which is constructed so as to provide for a maximum of brilliancy in display, and in which provision is made for altering the subject matter without interfering with its continued operation. Further objects are to provide an apparatus which is of comparatively simple construction, will not readily be fouled in operation, and requires comparatively little power for its operation in addition to the power consumed for illumination. Still other objects are to provide a device in which the power requirements for the illumination are materially reduced.

As herein illustrated, the apparatus, which is contained in a substantially closed housing, having in one wall a sight opening, has mounted within it an endless belt so arranged that a portion thereof is moved continuously along one side of the sight opening but is not exposed through it. The belt has a series of transparent pockets in it in which are placed objects for display, and display through the sight opening is effected by a source of light placed behind the belt so as to project a light beam through the belt onto a reflector disposed opposite the sight opening. The reflector is arranged to receive the images carried by the light beam and to reflect them through the sight opening. In the preferred form of the apparatus, the belt is mounted for movement upon spaced horizontally arranged rollers so that it has one horizontal run extending from end to end of the housing above the sight opening, and so that the rest of the belt hangs down at opposite ends. The belt is of considerable length, so that only a comparatively small length thereof spans the spaced rolls and that portion which rests near the bottom of the housing is gathered in folds. A pair of feed rolls at one end of the housing are power driven and draw the belt from the supporting roll at one end downwardly so as to deposit successive increments of the belt at the bottom of the housing and simultaneously to draw successive increments of the belt from the

2 opposite end of the housing upwardly over the other supply roll. At or near the bottom there is a support in the form of a continuously moving conveyor upon which the folds of the belt are deposited, and which moves in a direction to transport the folds slowly in the direction of their delivery to the opposite supporting roll. Near the end of the conveyor there is a fixed support upon which a plurality of folds is deposited from the conveyor prior to elevation onto the support roll at that end, and which holds the folds substantially immobile for a short period of time. This suffices, however, to permit removal and introduction of different objects in the belt without discontinuing operation of the belt and hence operation of the apparatus. The belt itself is comprised of superposed sheets of transparent material such as plastic, joined together at longitudinally spaced intervals to provide pockets, although any suitable analogous arrangement of transparent material which will afford supporting means for objects to be displayed may be used.

The invention will now be described in greater detail with reference to the accompanying drawings, wherein:

Fig. 1 is a longitudinal vertical section through the apparatus;

Fig. 2 is a horizontal section of the apparatus taken on the line 2—2 of Fig. 1;

Fig. 3 is a vertical section transversely of the machine taken on the line 3—3 of Fig. 2;

Fig. 4 is a transverse vertical section of an alternative form of the apparatus;

Fig. 5 is a vertical section through a portion of the belt;

Fig. 6 is a plan view of a fragmentary portion of the belt; and

Fig. 7 is a plan view of a typical object which may be placed in the pocket of the belt.

Referring to the drawings, the apparatus has a substantially rectangular housing consisting of top and bottom walls 10 and 12, end walls 14 and side walls 16, all of which are formed of sheet metal, and parts of which may be integral, such as the top and side walls, and have joined thereto the ends and bottom. The housing has in one of its side walls 16 a longitudinally extending, narrow, substantially rectangular sight opening 18.

Within the housing and on the inside of the end walls 14 near the top of the housing and above the upper edge of the sight opening, there are mounted brackets 20—20 which support a pair of cylindrical rolls 24 arranged to turn freely on horizontal axes extending transversely of the housing. A continuous belt B is entrained over these cylindrical rolls 24 so as to have a substantially horizontal run 26 extending lengthwise of the housing above the sight opening, depending portions 28 and 30 at opposite ends of the housing extending downwardly from the horizontal run into the bottom of the housing, and a bottom run 32 in the form of a series of gathers or folds which take up the excess length of the belt.

The belt B, as shown in Figs. 5 and 6, is comprised of superposed layers of transparent material 34 and 36, for example, any of the known transparent plastics having considerable strength integrally joined along one edge, as by folding of a single sheet, or consisting of two sheets stitched or otherwise fastened along one edge. The superposed sheets are also joined transversely at spaced intervals lengthwise of the belt by stitching 38, a suitable adhesive, or by fusing the material of the plies so as to provide spaced pockets 40 between the layers into which may be introduced through one edge objects 42 (Fig. 7) which are to be projected for display purposes. The objects 42 may be in the form of transparent sheet material 43 having marked or otherwise formed thereon a letter, figures, characters, pictures, etc. which are opaque so as to cut off light transmission therethrough, or are translucent and colored so as to modify light transmission therethrough. Due to the fact that the belt is supported through the greater part of its movement, it may be made of comparatively thin sheet plastic and still have sufficient strength to be serviceable indefinitely and, at the same time, because of its thinness and transparency, transmit a maximum of light, thereby requiring less expenditure of power for illumination.

The upper run 26 of this transparent belt is supported in a substantially horizontal plane between the cylindrical rollers 22 and 24 by a horizontally arranged transparent plate such as a sheet of glass 44, the opposite edges of which are engaged within spaced, facing, channel-like grooves 46, formed along the lower edges of spaced depending sheet metal walls 48 formed integral with a horizontal web 50 which is welded to the under side of the top wall 10 as illustrated in Fig. 3. Spacer strips 52 fast to the inside of the walls 48 engage the opposite edges of the belt and serve to guide it uniformly as it is drawn along the upper surafce of the supporting glass plate 44. Above the belt and within the spaced walls 44, there is mounted a pair of spaced illuminating elements, for example a pair of incandescent or fluorescent light tubes, and in order to project a maximum of the light emanating therefrom through the belt, a concave reflector R is fastened to the walls 48 behind the tubes.

The horizontal run 26 of the belt B is continuously drawn along below the lamp tubes and reflector by a pair of cooperating feed rolls 54 and 56 (Fig. 1) located at one end of the housing below the supporting roll 22. The feed roll 54 is journaled for rotation between spaced bracket members 58 fast to the end wall 14 and the feed roll 56 is mounted for free rotation about a horizontal axis paralleling the axis of the roll 54 on spaced bracket members 57, which in turn are pivotally supported on the brackets 58 for movement to and from the roll 54, and is yieldably urged toward the roll 54 by springs 60 so as to pinch the belt between the rolls 54 and 56. The roll 54 has a laterally extending shaft 59 on which there is fast a pulley 60 and over this pulley there is entrained one end of a belt 62, the opposite end of which is entrained over a pulley 64 fast to the shaft of a motor M which rests on the bottom of the housing and is secured thereto. When the motor is in operation, the feed roll 54 is positively driven and effects a continuous movement of the belt, drawing the vertical portion 28 of the belt downwardly so as to deposit successive increments of belt in the lower part of the housing, and raising successive increments of the vertical portion 30 from the lower part of the housing over the support roll 24 for movement in a horizontal position below the light tubes and reflector. In the lower part of the housing below the sight opening 18 there is a support 66 for receiving the belt as it is delivered by the feed rolls 54 and 56 in folds or gathers, and for transporting the folds slowly from the feed roll end of the housing to the opposite end thereof for redelivery to the support roll 24. The supporting means 66 is in the form of a substantially continuous conveyor, and as illustrated in Figs. 2 and 3, is made up of three horizontally disposed, spaced cylindrical rolls 68, 70 and 72, over which are entrained endless cords 72 and 74. Three of the cords 72 are placed about the cylindrical rolls 68 and 70 and are about equally spaced lengthwise thereof while two pairs of cords 74 are placed about the cylindrical rolls 70 and 71. While these cords are shown as of round cross section and as being seated in grooves formed in the rolls, they may be flat, or of other suitable configuration, and may or may not be seated in grooves in the rolls. These cylindrical rolls are supported above the bottom of the housing and journaled for rotation about horizontal longitudinal axes in spaced, parallel, horizontally arranged, C-shaped channels 88 which rest on and are fast to spaced, horizontally arranged angle brackets 86, welded to the opposite walls 16 of the housing. The conveyor is driven by positive rotation of the roll 71 in the following manner. At the bottom of the chamber there is fastened a pair of spaced journal posts 76, between which is journaled a horizontal shaft 78 having fast thereto a pulley 80. A belt 82 is entrained over the pulley 80 and a pulley 85 fast to the shaft of the driven roll 58. Also fast to the shaft 78 is a sprocket 84. A shaft 90 is journaled between the channel members 88 between the rolls 68 and 70 and this shaft, as shown in Fig. 2, has at one end a sprocket 92 and at its opposite end a bevel gear 96. A chain 94 is entrained over the sprocket 84 and the sprocket 92 so as to impart rotation to the shaft 90. A shaft 100 is mounted in journal brackets 102 fast to one of the channels 88 so as to extend forwardly from the shaft 90 to the roll 71, and has at one end a bevel gear 98 for engagement with the bevel gear 96, and at its opposite end a disc 104 for engagement with the end face of a disc 106 fast to the end of the roll 71. The shaft 100 is divided intermediate its ends and joined by a sleeve 108 so that its length may be varied by rotation of the sleeve, which is threaded internally for engagement with right and left-hand threads on the adjacent shaft ends. By varying the length of the shaft 100 the position of the disc 104 radially of the disc 106 may be changed so as to vary the speed of rotation of the roll 71, this arrangement being a common form of variable drive.

The conveyor 66 terminates short of the righthand end of the housing as shown in Fig. 1, and situated below it and between it and the end wall there is a flat, fixed platform or support 110 supported at its rear end from the bottom by a pair of spaced legs 112 and at its forward end by welding to the end wall. The platform 110 is of sufficient size to receive a substantial number of folds of the belt as it is pushed toward this end by the conveyor, and will hold them at rest for a short interval of time, that is, the folds are delivered to the platform 110 faster than the folds of the belt already resting thereon are drawn upwardly therefrom over the roll 24 so that there are always some of the folds at rest. This enables one servicing the machine to withdraw objects, indicia or other display matter from the pockets 40 of the folds at rest and to replace these with other matter. For this purpose a door or removable panel may be provided in the wall which may be opened or slid back so that the service man has access to the platform 110.

In order to guide the belt in its movement upwardly from the platform 110, there is fastened to the end wall 14 a bracket 114 on which is journaled a pair of spaced guide rolls 116 between which the belt passes during elevation to the roll 24. Guides 115 (Fig. 3) are also fastened to the inside of the side walls 16 in positions just above the plane of the conveyor 66, so as to abut the lateral edges of the folds of the belt during its movement from one end to the other of the storage chamber.

Since the moving belt is bound to pick up lint and dust, brushes 118 are fastened to the brackets 20 at opposite ends of the horizontal run thereof, to remove any dust which might cling to its surface and hence destroy the brilliancy of the display. Thus, the brilliancy is maintained substantially undiminished throughout the use of the apparatus.

Images of the objects carried by the belt and illuminated by the light tubes I are carried by the light beam emanating from the tubes to a reflector means 120 which redirects the beam through the sight opening. The reflector means consists of a rigid backing member 122 which is of substantially rectangular shape, hinged at 124 to the wall 16 opposite the sight opening, so as to extend from end to end of the sight opening. The forward face of the backing 122 has attached thereto a mirror, for example, a conventional plate glass mirror or some other highly reflective surface, on which the images of the objects carried by the belt are picked up by the light beam and are then redirected through the sight opening. The surface of the mirror is cylindrically concave along an axis parallel to its length and to the upper run of the belt as illustrated in Fig. 3. A pair of spaced adjusting bars 128 are pivotally hinged at 130 near the lower edge of the backing member 122 and extend rearwardly therefrom through holes 132 formed in the rear wall 16. Each bar 128 has on it a series of spaced teeth 134 for engagement with the wall marginally of the hole 132 and these may be held in engagement with the wall so as to adjust the angular position of the reflector by pivoted latches 136 which may be swung into engagement with the upper edges of the bars 128 to hold them down.

An alternative form of the apparatus is illustrated in Fig. 4 in which the essential features of the preferred apparatus are modified chiefly in their position, but not in the mode of operation. In this latter form of the apparatus, the housing has at the upper part of its wall 16 a sloping portion 140 opposite the sight opening 142 in the opposite wall 16. Below the sight opening and the sloping portion 140, the endless belt B is mounted for continuous movement in the same manner described with reference to the foregoing figures, that is, on spaced, parallel, supporting rolls 22 and 24 so as to have a horizontal run 26.

In this case, the horizontal run 26 is situated below the lower horizontal edge of the sight opening 142 and is contained and travels between a pair of horizontally arranged, spaced glass plates or other transparent members 144—144 held in spaced relation by spacer strips 143 and mounted in oppositely disposed channels 145 formed at the upper ends of spaced walls 146 joined by a web 148, which is welded to a horizontal partition 150, the edges of which are in turn welded to the walls 16 of the housing. The light tubes I and the reflector R are in this case mounted below the horizontal run of the belt between the walls 146, and the light beam is projected upwardly therefrom through the transparent plates 144—144 and the horizontal run 26 of the belt B situated therebelow.

The sight reflector for redirecting the light beam carrying the objects carried by the belt through the sight opening, in this form of the apparatus, is mounted above the horizontal run of the belt substantially parallel to the sloping portion 140 and consists of a rigid backing member and mirror 158 and 160 arranged with its lower edge resting in a channel 154 fast to the wall 16, so that it may be tilted in said trough angularly with respect to the sight opening. The reflecting surface of the mirror 160 like the mirror 126 is cylindrically concave lengthwise thereof along an axis parallel to the upper run of the belt as illustrated in Fig. 4. Spaced anchor tabs 166 are fastened to the upper edge of the sight reflector at opposite ends and have connected thereto, flexible cords 164 which extend rearwardly through a series of spaced eyes 166 fast to the inclined and vertical portion of the wall 16. The cords extend downwardly toward the base of the apparatus and are then brought forwardly and fastened to a channel member 168 which rests on the horizontal flange of a bracket 169 welded to the inside of the forward wall. The channel 168 is secured to the bracket 169 so as to be slidably movable forwardly and rearwardly thereon, and such movement is effected by one or more screws 170 threaded into one wall of the channel, which have knobs 172 at their ends outside of the housing. By rotating the knobs 172 the ends 164 may be shortened or lengthened to change the angular position of the sight reflector.

In either of its forms the apparatus is operated simply by starting the motor M and allowing the feed rolls 54—56 constantly to draw the belt B across the pulleys 22 and 24 with suitable objects or indicia inserted in the pockets of the belt. The display of the objects carried by the belt will be effected by the light beam emanating from the light tubes, which carry images of the objects carried by the transparent belt, onto the reflector and hence through the sight opening. Whenever it is desirable to change the subject matter of display, the belt may be serviced at the platform 110, where some of the folds are always temporarily at rest, by withdrawing objects pocketed in the belt and replacing them with other objects. Substantially the only upkeep in the apparatus is the supplying of new or different objects for display, and it is here pointed out that because the belt carrying the objects for display is housed out of registry with the sight opening, its life is prolonged materially, since the destructive effects of sunlight, moisture, etc., do not have direct access thereto and power requirements are maintained at a minimum because the parts through which the image carrying beam passes are not exposed to the elements and hence remain unclouded and clear.

It should be understood that the present disclosure is for the purpose of illustration only and that this invention includes all modifications and equivalents which fall within the scope of the appended claims.

I claim:

1. A display apparatus comprising a housing having a sight opening therein, a sight reflector in the housing inclined to and facing said sight opening, spaced supporting rolls within the housing, a continuous endless belt arranged on said supporting rolls with one run in a substantially horizontal position above the sight opening, and with the remainder of the belt suspended therefrom out of registry with the sight opening, said belt having transparent pockets therein in which are placed objects for display, means in the housing for projecting a light beam through the belt onto said sight reflector, said sight reflector being adapted to receive images carried by the light beam, and to redirect the beam through the sight opening, a storage space below the sight opening in which the suspended portion of the belt is stored, a pair of feed rolls close to one of the supporting rolls between which the belt passes from its horizontal run to the storage space, means for effecting rotation of the feed rolls continuously to draw successive portions of the belt across said supporting rolls and deliver them to the storage space, said belt being of such fullness that at any given time only a small portion thereof spans said rolls and the remainder falls in folds in the storage space, and a slowly traveling conveyor in the storage space on which the folded portions of the belt fall for conveying the folds slowly toward the opposite end of the housing for redelivery to the support rolls.

2. A display apparatus according to claim 1, wherein there is means for effecting movement of the conveyor at a lower rate of linear speed than the linear speed of the horizontal portion of the belt and there is means for varying the speed of the conveyor.

3. A display apparatus according to claim 1, wherein the conveyor includes a plurality of spaced parallel rolls distributed along the lower part of the housing, continuous cords entrained on said rolls for supporting the folds of the transparent belt, and a variable speed drive for one of the rolls, said other rolls being driven from the one roll through the intermediary of the cords forming the support for the folds of the transparent belt.

4. In a display apparatus according to claim 1, a stationary support at the remote end of the conveyor below the supporting rolls at that end for temporarily receiving a plurality of folds of the belt in a substantially immobile state prior to elevation of the belt therefrom to the supporting roll at that end.

5. In a display apparatus according to claim 1, a stationary charging platform at the discharge end of the conveyor for receiving and supporting a plurality of folds of the belt in a state of temporary immobility prior to the elevation of the belt to the supporting rolls, said charging platform having a horizontal surface parallel and subjacent to the plane of the conveyor.

6. A display apparatus according to claim 1 wherein the reflector is characterized in that its reflecting surface is concave.

7. A display apparatus according to claim 1 wherein the reflector is characterized in that its reflecting surface is cylindrically concave lengthwise, the longitudinal axis of the reflector being parallel to the belt.

JOSEPH TADDONIO.

References Cited in the file of this patent

UNITED STATES PATENTS

| Number | Name | Date |
|---|---|---|
| 375,348 | Fyfe | Dec. 27, 1887 |
| 945,652 | Weniger | Jan. 4, 1910 |
| 1,681,349 | Krause | Aug. 21, 1928 |
| 1,805,209 | Ellern | May 12, 1931 |
| 1,807,649 | Brown | June 2, 1931 |
| 1,869,465 | Cohan | Aug. 2, 1932 |
| 2,132,649 | Sacksteder | Oct. 11, 1938 |
| 2,206,806 | Chernow | July 2, 1940 |
| 2,296,272 | Sherbinin | Sept. 22, 1942 |
| 2,539,286 | Thompson | Jan. 23, 1951 |